(12) United States Patent
Archer et al.

(10) Patent No.: US 11,715,154 B2
(45) Date of Patent: Aug. 1, 2023

(54) SYSTEMS AND METHODS FOR MANAGING ACCOUNTS IN A FINANCIAL SERVICES SYSTEM

(71) Applicant: Green Dot Corporation, Austin, TX (US)

(72) Inventors: Kuan Archer, Glendale, CA (US); Harish Malhotra, Simi Valley, CA (US); Keith Stropus, Los Angeles, CA (US); Naveen Razdhan, Chino Hills, CA (US); Royce Hamano, Los Angeles, CA (US); John Salib, Northridge, CA (US)

(73) Assignee: Green Dot Corporation, Austin, TX (US)

( * ) Notice: Subject to any disclaimer, the term of this patent is extended or adjusted under 35 U.S.C. 154(b) by 0 days.

(21) Appl. No.: 16/137,422

(22) Filed: Sep. 20, 2018

(65) Prior Publication Data
US 2019/0095989 A1    Mar. 28, 2019

Related U.S. Application Data

(60) Provisional application No. 62/562,246, filed on Sep. 22, 2017.

(51) Int. Cl.
*G06Q 40/02* (2023.01)
*G06Q 20/40* (2012.01)
(Continued)

(52) U.S. Cl.
CPC .......... *G06Q 40/02* (2013.01); *G06Q 20/227* (2013.01); *G06Q 20/342* (2013.01); *G06Q 20/40* (2013.01)

(58) Field of Classification Search
CPC ........ G06Q 20/10; G06Q 40/02; G06Q 20/40; G06Q 30/02; G06Q 30/03; G06Q 20/227; G06Q 20/342
See application file for complete search history.

(56) References Cited

U.S. PATENT DOCUMENTS

| D42,210 S | 2/1912 | Hoch |
| 4,804,984 A | 2/1989 | Heuer et al. |

(Continued)

FOREIGN PATENT DOCUMENTS

| EP | 1209874 B1 * | 9/2007 | ............ G06Q 20/12 |
| EP | 1295500 B1 | 5/2009 | |

(Continued)

OTHER PUBLICATIONS

IBM Technical Disclosure Bulletin. vol. 33. Iss. 10A. pp. 362-366. Mar. 1991. (Year: 1991).*

(Continued)

*Primary Examiner* — Virpi H Kanervo
(74) *Attorney, Agent, or Firm* — KPPB LLP

(57) ABSTRACT

Systems and methods for creating accounts at a plurality of payment processors include a method that receives a first request to create a new account, and identifies a payment processor of the plurality of payment processors to handle the first request. The method determines whether a proxy for the new account exists in a local storage and sends a second request to the identified payment processor to create the new account, where the second request includes the proxy when the proxy for the new account exists.

15 Claims, 5 Drawing Sheets

(51) Int. Cl.
  *G06Q 20/22* (2012.01)
  *G06Q 20/34* (2012.01)

(56) References Cited

U.S. PATENT DOCUMENTS

| | | | |
|---|---|---|---|
| 4,939,662 | A | 7/1990 | Nimura et al. |
| 5,086,394 | A | 2/1992 | Shapira |
| 5,320,409 | A | 6/1994 | Katoh et al. |
| 5,740,915 | A | 4/1998 | Williams |
| 5,754,939 | A | 5/1998 | Herz et al. |
| 5,758,313 | A | 5/1998 | Shah et al. |
| 5,760,381 | A | 6/1998 | Stich et al. |
| 5,777,305 | A | 7/1998 | Smith et al. |
| 5,842,629 | A | 12/1998 | Sprague et al. |
| D411,765 | S | 7/1999 | Holihan |
| 5,918,909 | A | 7/1999 | Fiala et al. |
| 5,975,302 | A | 11/1999 | Young |
| 5,984,091 | A | 11/1999 | Orr et al. |
| 6,014,090 | A | 1/2000 | Rosen et al. |
| 6,049,711 | A | 4/2000 | Ben-Yehezkel et al. |
| 6,052,122 | A | 4/2000 | Sutcliffe et al. |
| 6,061,681 | A | 5/2000 | Collins et al. |
| 6,109,439 | A | 8/2000 | Goade, Sr. |
| 6,112,186 | A | 8/2000 | Bergh et al. |
| 6,185,545 | B1 | 2/2001 | Resnick et al. |
| 6,208,934 | B1 | 3/2001 | Bechtolsheim et al. |
| 6,224,108 | B1 | 5/2001 | Klure |
| 6,272,467 | B1 | 8/2001 | Durand et al. |
| 6,315,206 | B1 | 11/2001 | Hansen et al. |
| 6,317,718 | B1 | 11/2001 | Fano |
| 6,349,829 | B1 | 2/2002 | Matheis et al. |
| 6,366,568 | B1 | 4/2002 | Bolgiano et al. |
| 6,456,854 | B1 | 9/2002 | Chern et al. |
| 6,457,649 | B1 | 10/2002 | Hileman |
| 6,529,136 | B2 | 3/2003 | Cao et al. |
| 6,529,143 | B2 | 3/2003 | Mikkola et al. |
| 6,539,232 | B2 | 3/2003 | Hendrey |
| 6,549,768 | B1 | 4/2003 | Fraccaroli |
| 6,618,593 | B1 | 9/2003 | Drutman et al. |
| 6,639,905 | B1 | 10/2003 | Müller et al. |
| 6,687,608 | B2 | 2/2004 | Sugimoto et al. |
| 6,732,459 | B1 | 5/2004 | Clark |
| 6,819,919 | B1 | 11/2004 | Tanaka |
| 6,925,441 | B1 | 8/2005 | Jones, III et al. |
| 6,957,737 | B1 | 10/2005 | Frederickson et al. |
| 6,965,868 | B1 | 11/2005 | Bednarek |
| D512,456 | S | 12/2005 | Diaz |
| 7,039,423 | B2 | 5/2006 | Daniel et al. |
| 7,047,030 | B2 | 5/2006 | Forsyth |
| 7,071,842 | B1 | 7/2006 | Brady, Jr. |
| 7,082,365 | B2 | 7/2006 | Sheha et al. |
| 7,111,323 | B1 | 9/2006 | Bhatia et al. |
| D532,452 | S | 11/2006 | Heng |
| 7,139,731 | B1 * | 11/2006 | Alvin .......... G06Q 40/025 705/76 |
| 7,203,502 | B2 | 4/2007 | Wilson et al. |
| 7,203,674 | B2 | 4/2007 | Cohen |
| 7,236,799 | B2 | 6/2007 | Wilson et al. |
| 7,256,711 | B2 | 8/2007 | Sheha et al. |
| 7,271,742 | B2 | 9/2007 | Sheha et al. |
| 7,333,820 | B2 | 2/2008 | Sheha et al. |
| 7,363,027 | B2 | 4/2008 | Hon et al. |
| 7,392,935 | B2 | 7/2008 | Byrne |
| 7,486,958 | B2 | 2/2009 | Sheha et al. |
| 7,494,056 | B2 | 2/2009 | Sturm |
| 7,565,155 | B2 | 7/2009 | Sheha et al. |
| 7,593,740 | B2 | 9/2009 | Crowley et al. |
| 7,634,354 | B2 | 12/2009 | Salmre |
| 7,813,741 | B2 | 10/2010 | Hendrey et al. |
| 7,840,224 | B2 | 11/2010 | Vengroff et al. |
| 7,877,082 | B2 | 1/2011 | Eagle et al. |
| 7,917,154 | B2 | 3/2011 | Fortescue et al. |
| 7,978,900 | B2 | 7/2011 | Nepomniachtchi et al. |
| 8,000,726 | B2 | 8/2011 | Altman et al. |
| 8,023,963 | B2 | 9/2011 | Yonker et al. |
| 8,086,530 | B2 | 12/2011 | Resnick et al. |
| 8,099,109 | B2 | 1/2012 | Altman et al. |
| 8,181,789 | B1 | 5/2012 | Casella |
| 8,234,214 | B2 | 7/2012 | Templeton et al. |
| 8,275,699 | B2 | 9/2012 | Shader et al. |
| 8,352,367 | B2 | 1/2013 | Templeton et al. |
| 8,401,904 | B1 * | 3/2013 | Simakov ........... G06Q 20/3572 705/16 |
| 8,427,942 | B2 | 4/2013 | Kim et al. |
| 8,660,943 | B1 | 2/2014 | Chirehdast |
| 8,768,838 | B1 | 7/2014 | Hoffman |
| 8,875,990 | B2 | 11/2014 | Bishop et al. |
| 8,977,568 | B1 | 3/2015 | Schattauer et al. |
| 8,989,778 | B2 | 3/2015 | Altman et al. |
| 9,092,767 | B1 * | 7/2015 | Andrews .............. G06Q 10/067 |
| 9,710,804 | B2 * | 7/2017 | Zhou ................. G06Q 30/0273 |
| 9,947,004 | B2 | 4/2018 | Shankar et al. |
| 10,430,788 | B2 | 10/2019 | Driggs et al. |
| 10,937,088 | B2 | 3/2021 | Streit et al. |
| 11,216,810 | B2 | 1/2022 | Driggs et al. |
| 2001/0001321 | A1 | 5/2001 | Resnick et al. |
| 2002/0052786 | A1 | 5/2002 | Kim et al. |
| 2002/0077745 | A1 | 6/2002 | Ohmura et al. |
| 2003/0016804 | A1 | 1/2003 | Sheha et al. |
| 2003/0036848 | A1 | 2/2003 | Sheha et al. |
| 2003/0055983 | A1 | 3/2003 | Callegari |
| 2003/0060214 | A1 | 3/2003 | Hendrey et al. |
| 2003/0061211 | A1 | 3/2003 | Shultz et al. |
| 2003/0064705 | A1 | 4/2003 | Desiderio |
| 2003/0078035 | A1 | 4/2003 | Sheha et al. |
| 2003/0149527 | A1 | 8/2003 | Sikila |
| 2003/0150762 | A1 | 8/2003 | Biller |
| 2004/0030647 | A1 | 2/2004 | Hansen |
| 2004/0054428 | A1 | 3/2004 | Sheha et al. |
| 2004/0224703 | A1 | 11/2004 | Takaki et al. |
| 2005/0021560 | A1 | 1/2005 | Yoon et al. |
| 2005/0027543 | A1 | 2/2005 | Labrou et al. |
| 2005/0032527 | A1 | 2/2005 | Sheha et al. |
| 2005/0043060 | A1 | 2/2005 | Brandenberg et al. |
| 2005/0044409 | A1 | 2/2005 | Betz et al. |
| 2005/0054352 | A1 | 3/2005 | Karaizman |
| 2005/0073443 | A1 | 4/2005 | Sheha et al. |
| 2005/0075119 | A1 | 4/2005 | Sheha et al. |
| 2005/0101300 | A1 | 5/2005 | Hon et al. |
| 2005/0114527 | A1 | 5/2005 | Hankey |
| 2005/0159996 | A1 | 7/2005 | Lazarus |
| 2005/0166058 | A1 | 7/2005 | Brokenshire et al. |
| 2005/0171898 | A1 | 8/2005 | Bishop et al. |
| 2005/0197954 | A1 | 9/2005 | Maitland et al. |
| 2005/0216337 | A1 | 9/2005 | Roberts et al. |
| 2005/0250552 | A1 | 11/2005 | Eagle |
| 2005/0268254 | A1 | 12/2005 | Abramson et al. |
| 2005/0283620 | A1 | 12/2005 | Khulusi et al. |
| 2005/0289340 | A1 | 12/2005 | Camenisch |
| 2006/0027663 | A1 | 2/2006 | Tang |
| 2006/0036364 | A1 | 2/2006 | Matsuo et al. |
| 2006/0047825 | A1 | 3/2006 | Steenstra et al. |
| 2006/0064346 | A1 | 3/2006 | Steenstra et al. |
| 2006/0085443 | A1 | 4/2006 | Pae |
| 2006/0089160 | A1 | 4/2006 | Othmer |
| 2006/0186011 | A1 | 8/2006 | Palmer |
| 2006/0223518 | A1 | 10/2006 | Haney |
| 2006/0255154 | A1 | 11/2006 | Newbrough et al. |
| 2006/0270419 | A1 | 11/2006 | Crowley et al. |
| 2006/0278551 | A1 | 12/2006 | Bianchini et al. |
| 2007/0050129 | A1 | 3/2007 | Salmre |
| 2007/0112614 | A1 | 5/2007 | Maga et al. |
| 2007/0150414 | A1 | 6/2007 | Templeton et al. |
| 2007/0252009 | A1 | 11/2007 | Kingsborough et al. |
| 2007/0253712 | A1 | 11/2007 | Katagiri et al. |
| 2007/0278293 | A1 | 12/2007 | Anderson et al. |
| 2007/0281689 | A1 | 12/2007 | Altman et al. |
| 2007/0281690 | A1 | 12/2007 | Altman et al. |
| 2008/0022382 | A1 | 1/2008 | Bradbury et al. |
| 2008/0052182 | A1 | 2/2008 | Marshall et al. |
| 2008/0082424 | A1 | 4/2008 | Walton |
| 2008/0086414 | A1 | 4/2008 | Ching |
| 2008/0091535 | A1 | 4/2008 | Heiser |
| 2008/0103959 | A1 | 5/2008 | Carroll et al. |

(56) References Cited

U.S. PATENT DOCUMENTS

| | | |
|---|---|---|
| 2008/0109358 A1 | 5/2008 | Kottmeier et al. |
| 2008/0132252 A1 | 6/2008 | Altman et al. |
| 2008/0133322 A1 | 6/2008 | Kalia et al. |
| 2008/0133336 A1 | 6/2008 | Altman et al. |
| 2008/0188246 A1 | 8/2008 | Sheha et al. |
| 2008/0195536 A1 | 8/2008 | Karns et al. |
| 2008/0208697 A1 | 8/2008 | Kargman |
| 2008/0227473 A1 | 9/2008 | Haney |
| 2008/0237317 A1 | 10/2008 | Rosendall |
| 2008/0270802 A1 | 10/2008 | Ashley |
| 2009/0063286 A1 | 3/2009 | Rodriguez Porras |
| 2009/0081989 A1 | 3/2009 | Wuhrer |
| 2009/0090783 A1 | 4/2009 | Killian et al. |
| 2009/0164366 A1 | 6/2009 | Blythe et al. |
| 2009/0177375 A1 | 7/2009 | Jung et al. |
| 2009/0254413 A1 | 10/2009 | Chang |
| 2009/0298481 A1 | 12/2009 | Hurst |
| 2010/0036770 A1 | 2/2010 | Fourez et al. |
| 2010/0106568 A1 | 4/2010 | Grimes |
| 2010/0106569 A1 | 4/2010 | Grimes |
| 2010/0106577 A1 | 4/2010 | Grimes |
| 2010/0106596 A1 | 4/2010 | Grimes |
| 2010/0106598 A1 | 4/2010 | Grimes |
| 2010/0211499 A1 | 8/2010 | Zanzot et al. |
| 2010/0240352 A1 | 9/2010 | Suri et al. |
| 2010/0306089 A1 | 12/2010 | Gelerman et al. |
| 2010/0318489 A1 | 12/2010 | De Barros et al. |
| 2011/0016048 A1 | 1/2011 | Lindqvist et al. |
| 2011/0029434 A1 | 2/2011 | Templeton et al. |
| 2011/0035284 A1 | 2/2011 | Moshfeghi |
| 2011/0047619 A1 | 2/2011 | King et al. |
| 2011/0051665 A1 | 3/2011 | Huang |
| 2011/0099082 A1 | 4/2011 | Walker et al. |
| 2011/0184840 A1 | 7/2011 | Godard et al. |
| 2011/0208550 A1 | 8/2011 | Lamarche et al. |
| 2011/0208612 A1 | 8/2011 | Shader et al. |
| 2011/0208641 A1 | 8/2011 | Shader et al. |
| 2011/0208642 A1 | 8/2011 | Shader et al. |
| 2011/0208643 A1 | 8/2011 | Shader et al. |
| 2011/0208649 A1 | 8/2011 | Shader et al. |
| 2011/0225063 A1 | 9/2011 | Grunski et al. |
| 2011/0251892 A1 | 10/2011 | Laracey |
| 2011/0258122 A1 | 10/2011 | Shader |
| 2011/0270661 A1 | 11/2011 | Heiser, II et al. |
| 2011/0270756 A1 | 11/2011 | Tullis et al. |
| 2011/0275388 A1 | 11/2011 | Haney |
| 2011/0276374 A1 | 11/2011 | Heiser, II et al. |
| 2011/0276474 A1 | 11/2011 | Portillo |
| 2011/0313926 A1 | 12/2011 | Templeton et al. |
| 2012/0005085 A1 | 1/2012 | Pitroda |
| 2012/0022971 A1 | 1/2012 | Morris |
| 2012/0066081 A1 | 3/2012 | Shader |
| 2012/0095909 A1 | 4/2012 | Resnick et al. |
| 2012/0136789 A1 | 5/2012 | Kendrick et al. |
| 2012/0136790 A1 | 5/2012 | Templeton et al. |
| 2012/0150605 A1 | 6/2012 | Isaacson et al. |
| 2012/0233069 A1 | 9/2012 | Bulawa et al. |
| 2012/0246019 A1* | 9/2012 | Wolfe ................ G06Q 30/0207 705/26.1 |
| 2012/0292206 A1 | 11/2012 | Casella et al. |
| 2012/0296813 A1 | 11/2012 | Templeton et al. |
| 2012/0296814 A1 | 11/2012 | Templeton et al. |
| 2012/0310833 A1 | 12/2012 | Templeton et al. |
| 2013/0006785 A1 | 1/2013 | Perkins |
| 2013/0036034 A1 | 2/2013 | Karon et al. |
| 2013/0041729 A1 | 2/2013 | Shader |
| 2013/0041741 A1 | 2/2013 | Shader |
| 2013/0073403 A1 | 3/2013 | Tuchman et al. |
| 2013/0144734 A1 | 6/2013 | Perkins |
| 2013/0144789 A1 | 6/2013 | Aaltonen et al. |
| 2013/0204925 A1* | 8/2013 | McDougall ............ H04L 67/01 709/203 |
| 2013/0291127 A1 | 10/2013 | Bergman et al. |
| 2013/0317923 A1 | 11/2013 | Capps |
| 2014/0006191 A1 | 1/2014 | Shankar et al. |
| 2014/0012648 A1 | 1/2014 | Grimes |
| 2014/0012690 A1 | 1/2014 | Capps |
| 2014/0019322 A1 | 1/2014 | Streit et al. |
| 2014/0058837 A1 | 2/2014 | Grimes |
| 2014/0115710 A1 | 4/2014 | Hughes |
| 2014/0122684 A1 | 5/2014 | Brentano |
| 2014/0180819 A1 | 6/2014 | Grimes |
| 2014/0316988 A1 | 10/2014 | Nosek et al. |
| 2014/0351072 A1* | 11/2014 | Wieler .................. G06Q 20/40 705/21 |
| 2015/0081565 A1 | 3/2015 | Roullier et al. |
| 2015/0101062 A1 | 4/2015 | Silver et al. |
| 2015/0142655 A1 | 5/2015 | Ghosh et al. |
| 2015/0180736 A1* | 6/2015 | Leung ................ H04L 41/5054 709/226 |
| 2015/0193873 A1 | 7/2015 | Hammock et al. |
| 2015/0199725 A1 | 7/2015 | Aaltonen et al. |
| 2015/0206137 A1 | 7/2015 | Mazarim et al. |
| 2016/0071083 A1 | 3/2016 | Apps |
| 2016/0189213 A1 | 6/2016 | Gopalan et al. |
| 2016/0189229 A1 | 6/2016 | Gopalan et al. |
| 2016/0189230 A1 | 6/2016 | Gopalan et al. |
| 2016/0189292 A1 | 6/2016 | Deshpande et al. |
| 2016/0342967 A1 | 11/2016 | Proctor et al. |
| 2016/0379211 A1 | 12/2016 | Hoyos et al. |
| 2017/0024731 A1 | 1/2017 | Gullett et al. |
| 2017/0039551 A1 | 2/2017 | Driggs et al. |
| 2017/0053276 A1 | 2/2017 | Gullett et al. |
| 2017/0097996 A1 | 4/2017 | Gullett et al. |
| 2018/0308157 A1 | 10/2018 | Streit et al. |
| 2018/0315028 A1 | 11/2018 | Gullett et al. |
| 2020/0097957 A1 | 3/2020 | Driggs et al. |

FOREIGN PATENT DOCUMENTS

| | | | |
|---|---|---|---|
| WO | 2001060100 | 8/2001 | |
| WO | WO-2006004794 A2 * | 1/2006 | ............. G06Q 20/04 |

OTHER PUBLICATIONS

Anonymous: "WorldPay Launches Advanced RFI and Chargeback Management Platform." Business Wire (May 28, 2012). (Year: 2012).*

J. Cao, K. Li and I. Stojmenovic, "Optimal Power Allocation and Load Distribution for Multiple Heterogeneous Multicore Server Processors across Clouds and Data Centers," in IEEE Transactions on Computers, vol. 63, No. 1, pp. 45-58, Jan. 2014. (Year: 2014).*

International Search Report and Written Opinion for International Application No. PCT/IB2008/02235, Search Completed Apr. 23, 2009, dated May 28, 2009, 7 pgs.

International Search Report and Written Opinion for International Application No. PCT/US2007/012960, Search Completed Dec. 13, 2007, dated Jan. 3, 2008, 7 pgs.

International Search Report and Written Opinion for International Application No. PCT/US2009/049956, Search Completed Aug. 24, 2009, dated Sep. 1, 2009, 6 pgs.

Bahl, P. et al., "RADAR: An In-Building RF-based User Location and Tracking System", Proceedings of IEEE Infocom 2000, vol. 2, Tel-Aviv, Israel, Mar. 2000, 10 pgs.

Chintalapudi, Krishna K., "Indoor Localization Without the Pain, in Mobicom", Association for Computing Machinery, Inc., Sep. 2010, 12 pgs.

Duckham, et al., "Location Privacy and Location-aware computing", 2005, 20 pgs.

Eriksson, Jakob et.al., "Cabernet: Vehicular Content Delivery Using WiFi", MIT Csail Mobicom 2008, 13 pgs.

FierceWireless, "Sprint offers Loopt's social mapping service", Internet Article, [Online] Jul. 17, 2007, Retrieved from Internet at <http://fiercewireless.com/story/sprint-offers-loopts-social-mapping-service/07/17/2007> on Mar. 8, 2009, 1 page.

Jama, Isaak R., "Patent Examiner, Non-Final Office Action in U.S. Appl. No. 11/445,727, dated Jul. 25, 2008", 12 pgs.

Jama, Isaak R., "Patent Examiner, Non-Final Office Action in U.S. Pat. U.S. Appl. No. 11/445,729, dated Jun. 9, 2008", 12 pgs.

(56) References Cited

OTHER PUBLICATIONS

Jama, Isaak R., "Patent Examiner, Non-Final Office Action in U.S. Pat. U.S. Appl. No. 11/445,751, dated Jul. 10, 2008", 9 pgs.

Ji, Y. et.al., "Ariadne: A Dynamic Indoor Signal Map Construction and Localization System", In MobiSys, 2006, 14 pgs.

Karouia et al., "Video Similarity Measurement Based on Attributed Relational Graph Matching", N.T. Nguyen, R. Katarzyniak (Eds.): New Challenges in Applied Intelligence Technologies, SCI 134, 2008, 10 pgs.

Lat49, "screen capture of http://lat49.com/howitworks/index.php", Jun. 12, 2009, 2 pgs.

Madigan, D. et al., "Bayesian Indoor Positioning Systems", In Infocom, 2005, 11 pgs.

Nguyen, Khai Minh, "Patent Examiner, Non-Final Office Action in U.S. Appl. No. 11/445,730, dated Apr. 29, 2009", 14 pgs.

Nguyen, Khai Minh, "Patent Examiner, Non-Final Office Action in U.S. Appl. No. 11/881,836, dated Jul. 23, 2009", 22 pgs.

Schreiner, Keri, "Where We at? Mobile Phones Bring GPS to the Masses", IEEE Computer Graphics and Applications vol. 27, No. 3, May 2007-Jun. 2007, 6 pgs.

secretadmirer.com, "screen capture using http://web.archive.org of http://secretAdmirer.com website", Dec. 2, 1998, 2 pgs.

Youssef, M. et.al., "The Horus WLAN Location Determination System", In MobiSys, 2005, 14 pgs.

\* cited by examiner

SYSTEMS AND METHODS FOR MANAGING ACCOUNTS IN A FINANCIAL SERVICES SYSTEM

CROSS-REFERENCE TO RELATED APPLICATIONS

The current application claims priority to U.S. Provisional Patent Application Ser. No. 62/562,246 filed Sep. 22, 2017, entitled "Systems and Methods for Managing Accounts in a Financial Services System", the disclosure of which is incorporated by reference herein in its entirety.

FIELD OF THE INVENTION

The present disclosure relates generally to financial services systems, and relates, more particularly, to account management through payment processors of the financial services systems.

BACKGROUND

The financial services industry provides a plethora of financial services to consumer accounts for managing their finances and engaging in financial transactions with retailers and service providers. Consumer accounts may hold funds within many different types of accounts at many different types of financial institutions. Consumer accounts may access the funds held in the accounts using many different types of cards, including credit cards, debit cards, gift cards, and other types of cards based on the particular type of account associated with the card. The cards may be issued from financial institutions, such as banks, credit unions, savings & loans, and brokerage institutions.

A payment processor (or issuer payment processor) is a company that handles transactions for one or more financial institutions. Many payment processors have connections to various card associations and supply authorization and settlement services to the financial institutions. Several payment processors facilitate the creation of accounts at the financial institutions, as well as the movement of funds between payment processors and financial institutions. Payment processors verify aspects of proposed transactions. Once a payment processor has received confirmation or denial of the verification, the information can be relayed to the financial institution that can then complete or invalidate the payment transaction accordingly.

SUMMARY OF THE INVENTION

Systems and methods for creating accounts at a plurality of payment processors in accordance with embodiments of the invention are illustrated. One embodiment includes a method that receives a first request to create a new account, and identifies a payment processor of the plurality of payment processors to handle the first request. The method determines whether a proxy for the new account exists in a local storage and sends a second request to the identified payment processor to create the new account, where the second request includes the proxy when the proxy for the new account exists.

In another embodiment, the new account is for a prepaid card.

In a further embodiment, the method identifies the payment processor by determining capabilities of each payment processor of the plurality of payment processors and identifies the payment processor based on the determined capabilities.

In still another embodiment, the capabilities of each payment processor includes a number of transactions per second that the payment processor can handle.

In a still further embodiment, the account information includes an account number.

In yet another embodiment, upon determining that the proxy does not exist, the method retrieves account information for the new account in response to the second request, and provides the retrieved account information in response to the first request.

In a yet further embodiment, the method includes providing the proxy in response to the first request prior to sending the second request to the identified payment processor.

In another additional embodiment, the method receives a third request to perform a multi-part transaction between a plurality of accounts managed by a virtual payment processor, wherein the third request comprises a first part with a first account of the plurality of accounts and a second part with a second account of the plurality of accounts. The method performs the first part of the multi-part transaction, determines whether the second part has completed successfully. Upon determining that the second part has not completed successfully, the method rolls back the first part of the multi-part transaction.

In a further additional embodiment, upon determining that the second part has not completed successfully, the method suppresses validations at a payment processor associated with the first account.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

DETAILED DESCRIPTION

Turning now to the drawings, systems and methods for managing transactions and accounts in an account servicing system in accordance with embodiments of the invention are disclosed. In many cases, a consumer (or other user) desires to create an account or to perform a set of transactions with one or more financial institutions. Although many of the examples described below are described with reference to prepaid cards, accounts in accordance with many embodiments of the inventions can include accounts for a variety of uses, including (but not limited to) credit cards, gift cards, online accounts, and virtual wallets.

Prepaid cards allow consumer accounts to load funds onto their account at a variety of participating locations, such as retailers. Funds can be loaded onto a prepaid card (i.e. deposited into an account associated with the prepaid card) through various mechanisms, including direct-deposit, check deposit, wire transfers, online deposits, cash deposits, and any other techniques as applicable to the requirements of specific embodiments of the invention. Consumer accounts can then use the prepaid cards in a manner similar to traditional debit and/or credit cards to purchase goods using the funds that have been loaded onto the account.

Account Servicing Systems

Conducting financial transactions can involve communication between many different parties, such as (but not limited to) banks, processors, credit issuers, regulators, retailers, and consumer accounts. Financial transactions can include any of a variety of actions in which funds are being exchanged between a parties, such as (but not limited to) a debits, credits, and transfers. For example, a consumer account may initiate a purchase at a point-of-sale terminal of a retailer. The retailer may track certain information for the consumer account, including the items being purchased and the total purchase price and may send this information to a merchant payment processor associated with the merchant's financial institution. In some cases, the merchant payment processor can communicate with issuer payment processors that manage the consumer accounts for several issuers (e.g., financial institutions such as banks, credit cards, and credit unions) of the card in order to process the transaction.

Figure 1:
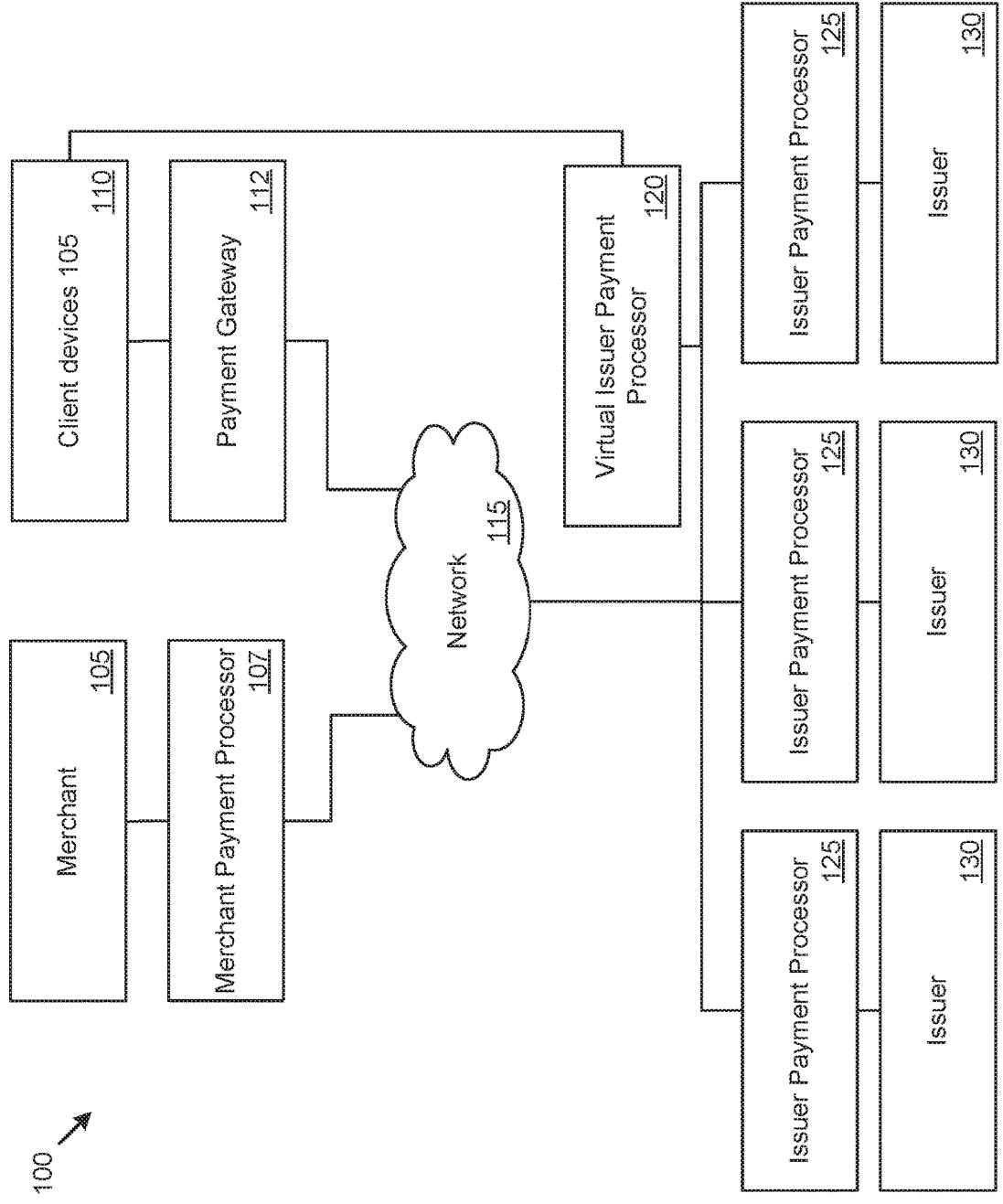
FIG. 1 is another conceptual illustration of an account servicing system in accordance with an embodiment of the invention.

A conceptual illustration of an account servicing system for managing accounts through a set of issuer payment processors is illustrated in FIG. 1. The system 100 includes merchant systems 105, merchant payment processor 107, client devices 110, and payment gateway 112, which communicate through network 115 with virtual issue processor 120, issue processors 125, and issuers 130. In many embodiments, networks can include, but are not limited to, the Internet, a local area network, a wide area network, and networks that are shared privately between only a subset of the systems. Networks in accordance with several embodiments of the invention include card associations, which include a network provided by an association of banks that is used to handle the communication of transactions between the banks.

Consumers can interact with merchant systems in a variety of ways, including (but not limited to) purchasing a pre-paid card from a merchant to create a new account, reloading a card to add funds to an existing account, transferring funds between an account and another account, as well as making purchases of goods and/or services from a merchant using funds from a consumer's account (e.g., through a credit card, gift card, mobile app, etc.). Merchant systems can include point of sale terminals, merchant databases, and inventory systems, which can collect and store various data related to purchases made by consumers. In a variety of embodiments, merchant systems obtain various data from a number of point of sale terminals and transmit the transaction data to a virtual issuer payment processor, other issuer payment processors, and/or directly to issuers.

In many cases, the networks allow a merchant processor to communicate with issuer payment processors of a number of different issuers. In many cases, merchant systems can communicate with a network 115, such as (but not limited to) a card association, through a third party merchant processor 112, which handles the transactions between a merchant's bank and a variety of issuers (such as, but not limited to, banks, credit card companies, and credit unions) associated with the consumers. In some cases, consumers do not work directly with merchants, but initiate account services with an issuer payment processor (or virtual payment processor) through other channels, such as (but not limited to) the Internet.

In some embodiments, consumers can use client devices 105 (e.g., via a mobile app and/or website) to interact directly with their account to add, withdraw, and/or transfer funds from their account, as well as any other transactions or operations as appropriate to the requirements of specific applications of embodiments of the invention.

In a number of embodiments, client devices include a software application that a consumer can sign on to in order to associate a particular consumer account with a client device. In some embodiments, consumers can process their transactions (such as, but not limited to purchases, fund loads, and fund transfers) through a payment gateway 107 for Internet based interactions.

In several embodiments, merchant payment processors and/or payment gateways can communicate with issuer payment processors 120-125 to manage accounts at issuers 130 and to facilitate the execution of transactions between consumer accounts and merchant systems. Issuer payment processors in accordance with many embodiments of the invention provide services for creating and managing accounts (e.g., for prepaid cards) via a number of account management processes as appropriate to the requirements of specific applications of embodiments of the invention. Issuer payment processors can obtain account data for a consumer from a financial system, a merchant payment processor, and/or from a client device.

Issuer payment processors 125 in accordance with a number of embodiments of the invention can process transactions on behalf of issuers 130. Issuers 130 in accordance with a number of embodiments include financial accounts for one or more entities. These financial accounts hold funds on behalf of consumers (or other entities) and can transfer the funds to retailer systems, payment processors, account servicing server systems, or any other system as appropriate to the requirements of specific applications of embodiments of the invention. Issuers (or financial institutions) in accordance with several embodiments of the invention can include (but are not limited to) retailer systems, card issuers, banks and credit unions. In many embodiments, prepaid cards serviced by the account servicing server system are associated with a particular issuer payment processor. In many embodiments, issuers 130 incorporate some or all aspects of the issuer payment processors 125. In this way, issuers can issue, service, and/or approve transactions related to various accounts.

In certain embodiments, client device 120 can communicate (e.g., over the Internet) with a virtual issuer payment processor 120 to manage their account. Client devices in accordance with some embodiments of the invention can initiate requests to create new accounts, transfer funds between accounts, and any other transactions or operations as appropriate to the requirements of specific applications of embodiments of the invention. In some embodiments, virtual issuer payment processor 120 handles requests for a set of issuer payment processors 125 in order to abstract away the various issue processors of the various issuers.

In some embodiments, virtual issuer payment processors operate as a cloud service that interacts with merchant payment processors and payment gateways through an application programming interface (API). Virtual issuer payment processors can act as a single issuer payment processor, providing a single point of access, while maintaining the ability to create an account on one of multiple issuer payment processors. Virtual issuer payment processors can then provide greater flexibility in creating accounts and distributing transactions between the issuer payment processors. The selection of a particular issuer payment processor at which to create an account can be made based on a variety of factors, including (but not limited to) a transaction cost for the processor, characteristics of a consumer, a number of accounts currently active at the processor, a historic activity level at the processor, and/or a capacity of the processor.

In a variety of embodiments, virtual issuer payment processor 120 issues prepaid cards for consumers. Virtual issuer payment processors in accordance with many embodiments of the invention can allow a consumer to create prepaid cards that are associated with one of a variety of issuer payment processors. In some embodiments, virtual payment processors can provide a transaction interface that can be utilized to process transaction data. The transaction data can be obtained from any system, including the retailer system. In a number of embodiments, the virtual issuer payment processor 120 processes transactions for prepaid cards (or any other account) issued by (or otherwise associated with) one of the issuer payment processors 125.

Virtual issuer payment processors in accordance with some embodiments determine whether a transaction should be validated, either directly or through a separate validation service. Validation in accordance with several embodiments of the invention includes determining whether a request exceeds limit rules for an account (e.g., how much money can be transferred to/from the account), verifying that an account is in compliance with various regulatory and/or business rules (e.g., policies of the Office of Foreign Asset Control (OFAC), Customer Identification Program (CIP) rules, etc.). If a transaction is validated, funds drawn from an account associated with the prepaid card are directed to be transferred to an account associated with the retailer identified in the transaction. The transfer of funds can include transmitting requests to one or more issuers and/or an issuer payment processor in order to execute the requested transaction. In several embodiments, if the transaction is not validated, virtual issuer payment processor 120 can request additional information from a merchant processor and/or a payment gateway. This additional information can then be utilized to re-process the transaction, potentially resulting in the transaction being validated.

In some cases, a transaction can be made up of multiple transactions. For example, in the case of a transfer of funds between a first and second account, the transfer can include a first transaction to deduct funds from the first account and a second transaction to add funds to the second account. In this example, a transfer is conducted between two accounts, but transfers can include transactions between any number of accounts for a single user. In some embodiments, virtual issuer payment processors can perform multiple actions (e.g., during a transfer between a first and second account) as a single atomic transaction, which cannot be partially performed (e.g., deducting funds from the first account without adding funds to the second account), but rather is either completely performed or not performed at all. Systems in accordance with many embodiments of the invention look for transactions that appear to have gone bad, and reverses them to ensure that the consumer accounts are rolled back to the state they were in before the transaction was attempted. In several embodiments, a system identifies transactions that may have gone bad or failed by identifying transactions that have been in a PENDING state for longer than a threshold amount of time (e.g., 5 minutes). Systems in accordance with numerous embodiments of the invention can determine that a transaction has failed after a threshold number of retries have failed. In a number of embodiments, systems can gradually increase the rollback re-try interval based on a re-try counter to ensure that if there is a systemic failure (e.g., if a processor is completely down), the system does not overload itself with retries.

Figure 5:
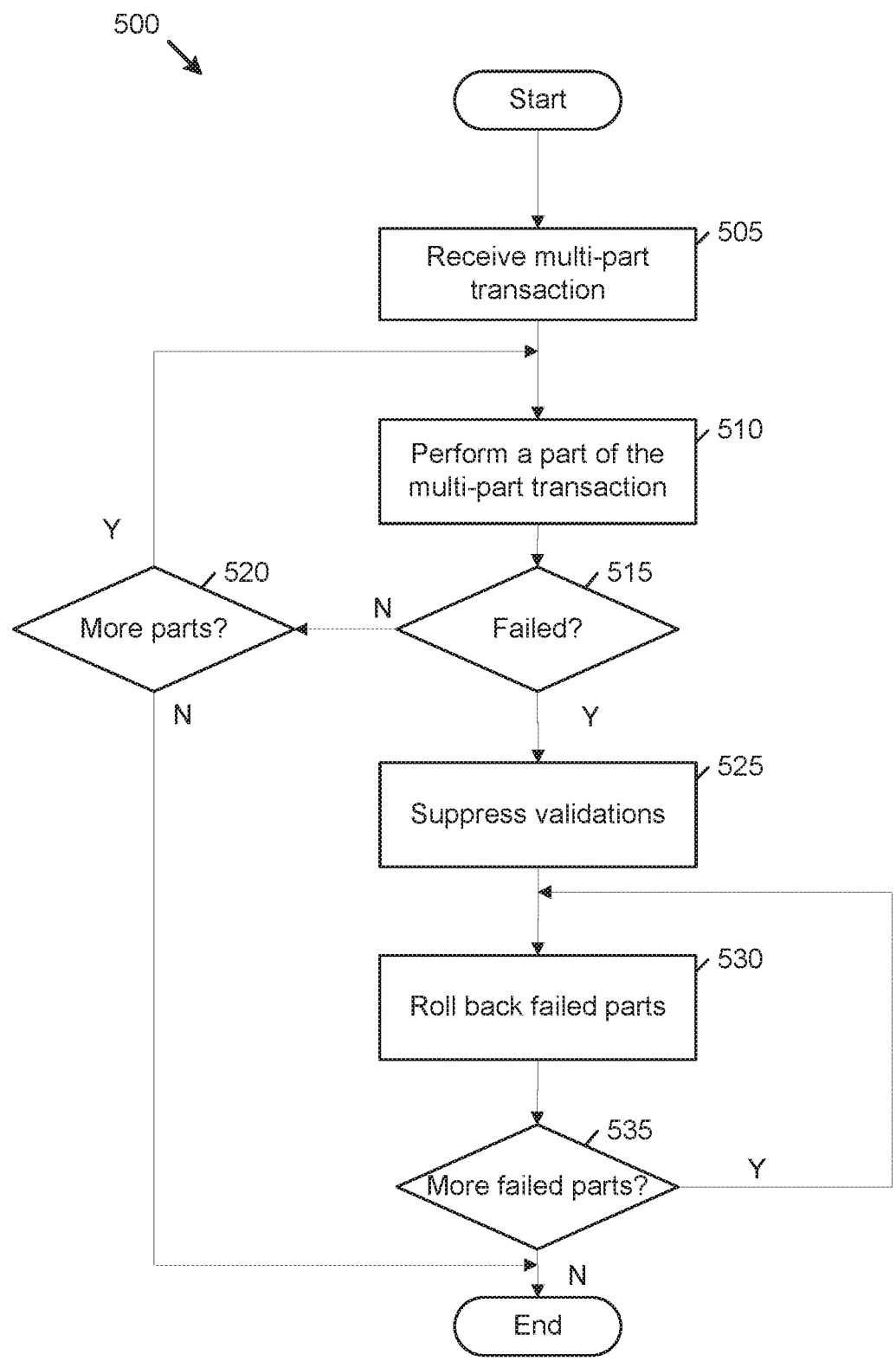
FIG. 5 is a flow chart illustrating a process for rolling back a transaction in accordance with an embodiment of the invention.

When a transfer is to be rolled back, systems in accordance with certain embodiments of the invention suppress validations to ensure a guaranteed rollback. For example, if other transactions have occurred, limit rules (e.g., restrictions on the amount of funds that can be added or withdrawn from an account) should not block the rollback from happening. In some cases, a transaction can be put into a HOLD state, where a transfer has been initiated, but the receiver of the transfer has not accepted the transfer. In a number of embodiments, systems can also expire HOLD transfers that have not been claimed after a threshold period of time (e.g., 7 days). In such cases, systems in accordance with many embodiments of the invention do not suppress validations and notifications. A process for rolling back transactions is described in greater detail below with reference to FIG. 5.

Although a specific architecture of an account servicing system in accordance with embodiments of the invention are discussed above and illustrated in FIG. 1, a variety of architectures can be utilized in accordance with embodiments of the invention. Furthermore, it should be noted that any data created and/or transferred within the system can be provided by any system in any manner (i.e. via one or more application programming interfaces (APIs) web services, and/or file-based interfaces) as appropriate to the requirements of specific applications of embodiments of the invention. Systems and processes for managing accounts through a set of payment processors in accordance with embodiments of the invention are described in more detail below.

Account Servicing Server Systems

As described above, virtual payment processor systems can provide a variety of services for prepaid cards. A virtual payment processor system in accordance with an embodiment of the invention is conceptually illustrated in FIG. 2. Virtual payment processor system 200 includes a processor 210 in communication with a network interface 220 and a memory 230. The network interface 220 is configured to send and receive data over a network connection. In a number of embodiments, the network interface 220 is in communication with the memory 230. In several embodiments, memory 230 is any form of storage configured to store a variety of data, including, but not limited to, a virtual payment processor application 232, processor data 234, and historic account data 236.

Virtual payment processor application 232 directs the processor 210 to perform a variety of account servicing processes. The account servicing processes include, but are not limited to, creating new consumer accounts and processing financial transactions for a consumer account, including reconciliation of debits and credits applied to a consumer account's account. In many embodiments, virtual payment processor applications filter incoming requests that are directed to one of a group of payment processors to prevent duplicate requests from being sent to the payment processors. Duplicate requests can be triggered at a client device that uses an intelligent short circuit process to timeout the requests so that the client device can continue to be responsive to consumer, while waiting for a response from the payment processors.

It can be difficult to support multiple simultaneous client's requests to create accounts or to transfer money among accounts. Virtual payment processors in accordance with a number of embodiments of the invention distribute requests for the payment processors (e.g., requests to create new accounts) between the payment processors based on a variety of factors, including (but not limited to) a transaction cost for each processor, characteristics of a consumer, a number of accounts currently active at each processor, a historic activity level at each processor, and/or a capacity of each processor.

For example, in many cases, payment processors can be limited in the number of transactions per second (TPS) they are able to handle at a given time. Systems and methods in accordance with a variety of embodiments of the invention can distribute load among multiple payment processors based on a processor's capacity. For example, if a client has a requirement to support 1000 TPS, processor p1 can support only 400 TPS and processor p2 can support only 600 TPS. Virtual processor can then route 40% of create account requests to p1 and 60% to p2.

In many embodiments, virtual payment processors use various sets of data including (but not limited to) processor data, business rule data, and historic account data. Processor data 234 can include a variety of information related with each of the payment processors associated with a virtual payment processor system. Processor data in accordance with a number of embodiments of the invention includes a cost per transaction, a capacity (e.g., a number of transactions that can be processed by the payment processor), and an expected response time for each payment processor. Historic account data 236 can describe the consumer account's account including, but not limited to, reload activity, balance activity, and location data, consumer account profile data, demographic data, employment information, credit status, income, mailing address, and/or any other consumer account pertinent information. Account data can include data received from a variety of different sources, including (but not limited to) retailers, payment processor systems, financial institution systems, and any other of a variety of other sources.

Figure 2:
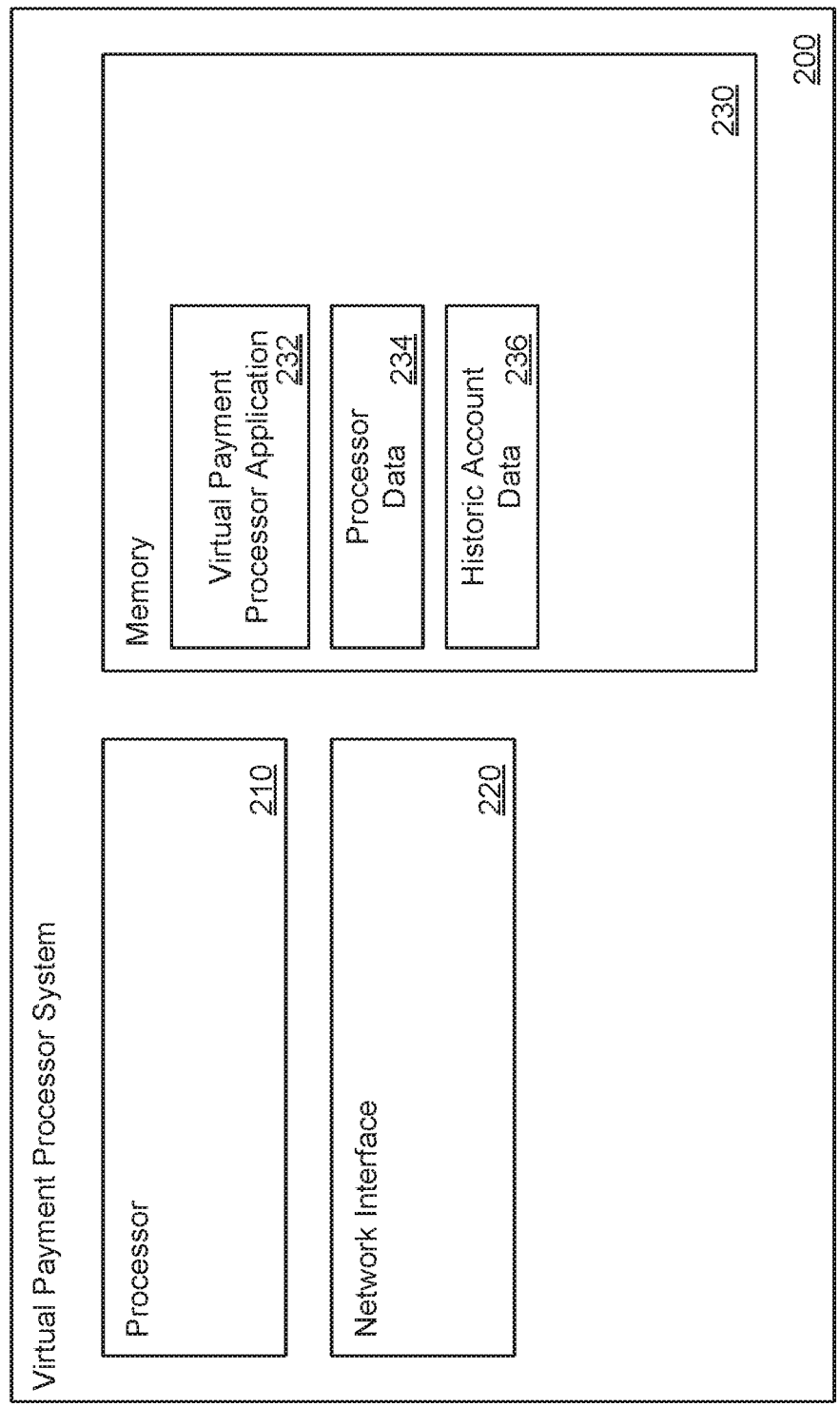
FIG. 2 is a conceptual illustration of a virtual payment processor system in accordance with an embodiment of the invention.

Although a specific architecture for an account servicing server system in accordance with an embodiment of the invention is conceptually illustrated in FIG. 2, any of a variety of architectures, including those that store data or applications on disk or some other form of storage and are loaded into memory at runtime, can also be utilized. In a variety of embodiments, memories of a virtual processor system include circuitry such as, but not limited to, memory cells constructed using transistors, that are configured to store instructions. Similarly, processors can include logic gates formed from transistors (or any other device) that are configured to dynamically perform actions based on the instructions stored in the memory. In several embodiments, the instructions are embodied in a configuration of logic gates within the processor to implement and/or perform actions described by the instructions. In this way, the systems and methods described herein can be performed utilizing both general-purpose computing hardware and by single-purpose devices. A variety of account servicing processes in accordance with embodiments of the invention are discussed further below.

Creating Consumer Accounts

Figure 3:
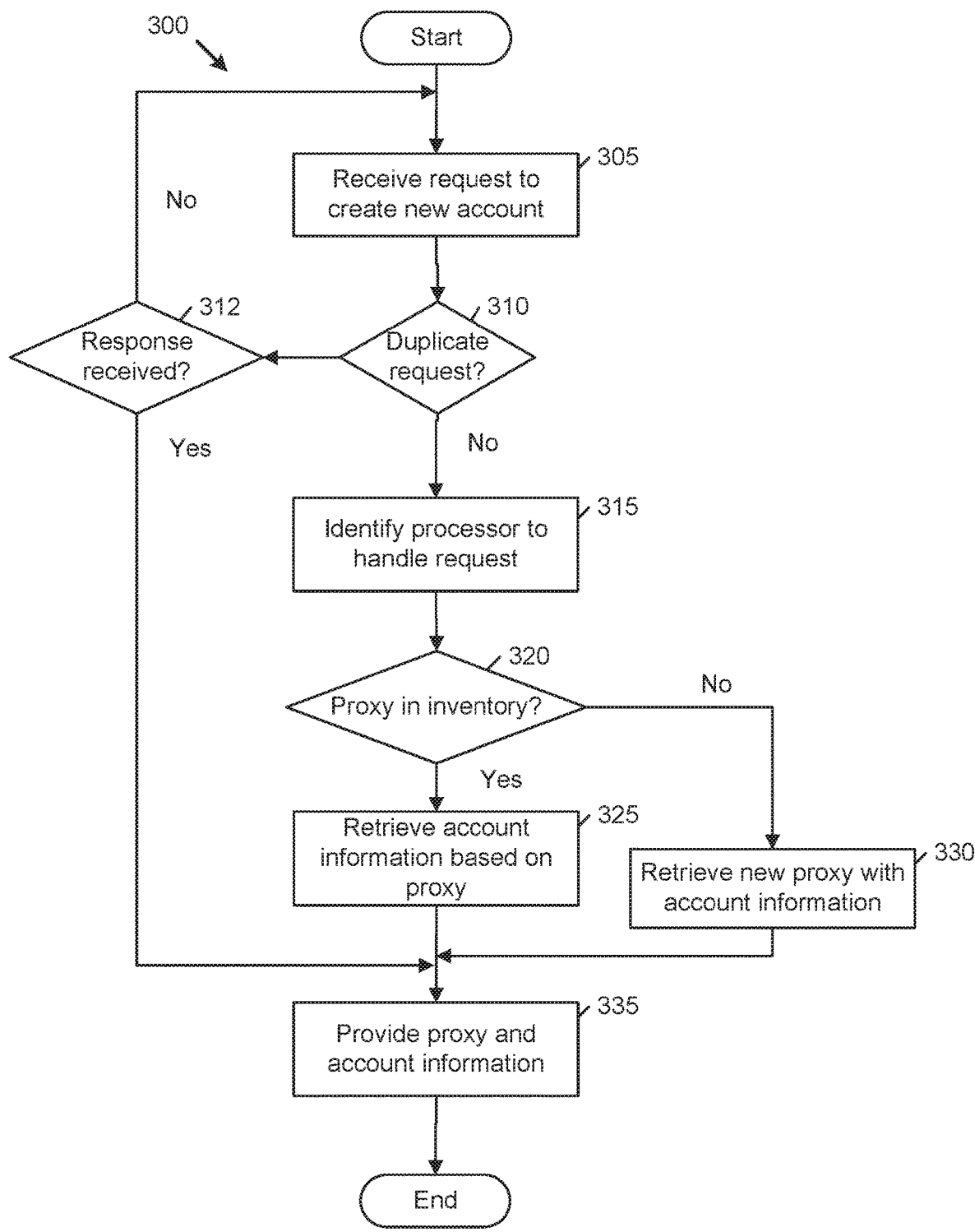
FIG. 3 is a flow chart illustrating a process for creating a new account in accordance with an embodiment of the invention.

In a number of embodiments, virtual processor systems are used to create new consumer accounts, such as (but not limited to) accounts for prepaid cards, credit cards, debit cards, virtual accounts, and gift cards. Systems, methods, and computer program products in accordance with a variety of embodiments of the invention can optimize routing of creation of digital accounts on multiple pre-paid processors by determining routing on a per-account, transaction basis based on one or more routing rules. In a number of embodiments, routing rules can take into account a variety of factors such as, but not limited to, cost of account maintenance, processor transactions per seconds capacity. Processes for creating new accounts in accordance with several embodiments of the invention are performed through virtual processor systems that communicate with a set of issuer payment processors. A process for creating new accounts through issuer payment processors is illustrated in FIG. 3.

The process 300 receives (305) a request from a client to create a new account. Clients can include (but are not limited to) merchant PoS terminals, mobile applications, and websites. Requests can include a variety of information, including (but not limited to) information about a consumer to be associated with the card, information about the account set up, and/or information about a merchant or retailer that initiated the request for the new account. Such information can include (but is not limited to) credit scores, credit history, pre-load amounts, geographic locations, a number of previous requests for new accounts, and/or an amount of funds that have been loaded into other new accounts. In many embodiments, the requests for a new account are initially validated and/or authorized (e.g., based on the consumer and/or merchant information) before they are received by a virtual payment processor.

In several embodiments, the process determines (310) whether the request is a duplicate request. Duplicate requests can result when a source resends a request (e.g., after an initial request times out). When the process determines (310) that the request is a duplicate request, the process determines whether a response has been received for the request from the payment processor. When no response has been received, the process disregards the request and waits to receive a new request. Alternatively, in certain embodiments, the process responds to the client with a request to retry the request. Clients in accordance with many such embodiments can make a decision of how long to wait before retrying the request. When the process determines (312) that a response has been received for the request, the process provides (335) the requested information to the requestor. Providing a response to the requestor is described in further detail below.

When the process determines (310) that the request is not a duplicate request, the process identifies (315) a processor to handle the request. In many embodiments, processors are identified from a group of processors based on a set of factors, including (but not limited to) a number of accounts currently active with each processor, a historic usage rate for each processor, a cost associated with the use of each processor, a capacity of each processor, and/or characteristics of a user associated with the new account (e.g., income, reload amount, geographic location, etc.).

The process in accordance with certain embodiments of the invention determines (320) whether a proxy for a new account is currently available in inventory. The inventory acts as a sort of cache, in which a group of proxies are collected from each of one or more processors. Each proxy can be associated with an account that has been initialized at the associated processor. When the process determines (320) that a proxy is available, the process retrieves (325) account information from an associated processor that is associated with the available proxy. Account information in accordance with several embodiments of the invention includes a primary account number (PAN) and/or other account characteristics, such as, but not limited to, account benefits, interest rates, and/or account limits. When the process determines (320) that a proxy is not available, the process retrieves (330) a new proxy with account information from the identified processor. In certain embodiments, when a proxy is not available, the process retrieves a set of proxies for new accounts to be stored in the inventory.

The process provides (335) the proxy and retrieved account information to the client that initiated the request. Clients in accordance with many embodiments use a proxy and associated account information to initialize a card (e.g., a pre-paid card), and to associate the card with the newly created account. In many embodiments, consumers can use such cards to transfer funds, withdraw funds, make purchases at various retailers, and/or to add additional funds to the associated account.

Specific process for creating new consumer accounts in accordance with embodiments of the invention are described above; however, one skilled in the art will recognize that any number of processes can be utilized as appropriate to the requirements of specific applications in accordance with embodiments of the invention.

Transferring Funds

Figure 4:
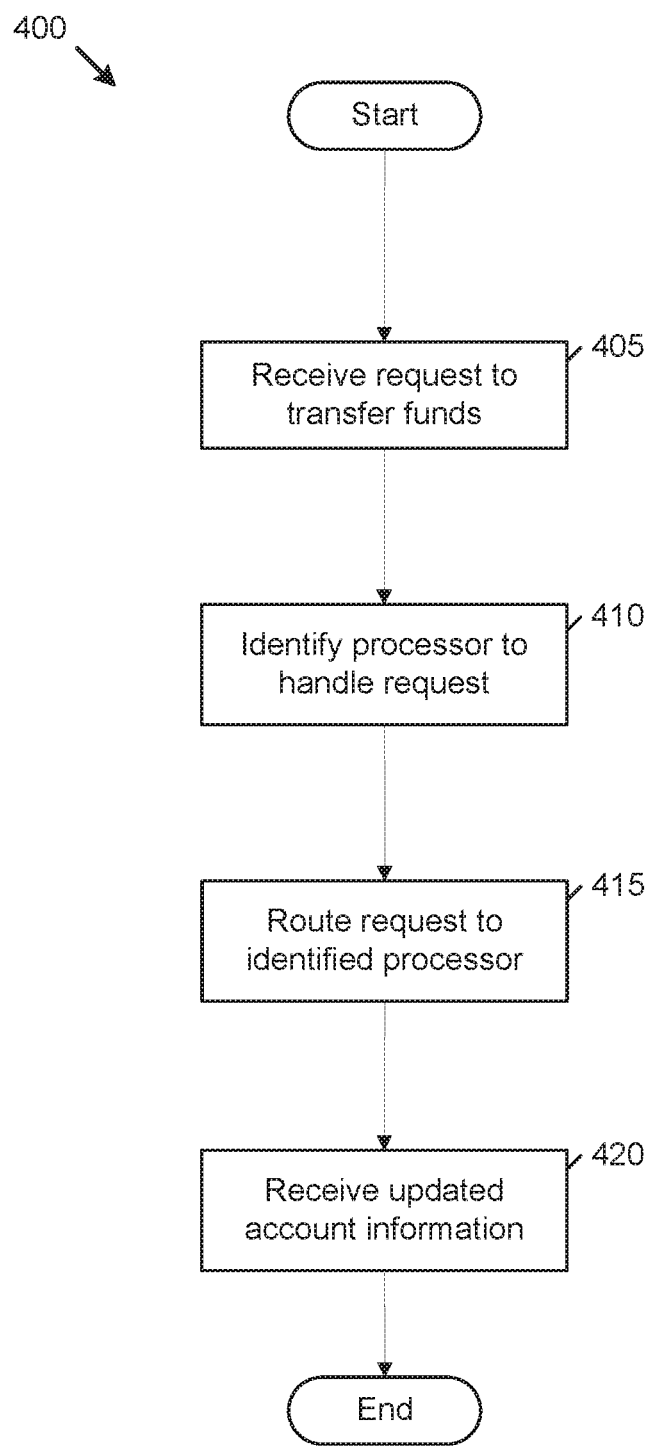
FIG. 4 is a flow chart illustrating a process for transferring funds of an account in accordance with an embodiment of the invention.

A process for transferring funds through processors is shown in FIG. 4. The process 400 receives (405) a request to transfer funds. Transfers of funds can include (but are not limited to) transfers of funds between individuals, cash withdrawal of funds, purchases at various retailers, and/or the addition of funds to an associated account. The process identifies (410) a processor (or a set of processors) to handle the request. Processors can be identified based on a variety of factors, including (but not limited to) a processor associated with each party to a transaction, an issuer associated with each party to a transaction, transaction capabilities of each processor, and a cost for each processor.

The process routes (415) a request to transfer funds to the identified processor. In many embodiments, requests can be modified or recreated to conform to a format dictated by each particular processor. The process receives (420) updated account information. Updated account information in accordance with several embodiments of the invention includes (but is not limited to) updated account balances and/or error notifications.

In some cases, transferring funds can include multiple parts, or a series of transfers, that make up a single transaction, which need to be either performed as a single unit, or should not be performed at all. A process for rolling back transactions is conceptually illustrated with reference to FIG. 5. Process 500 receives (505) a multi-part transaction. Multi-part transactions in accordance with a number of embodiments of the invention can refer to any transaction that requires multiple actions (e.g., credits, debits) at multiple issuers by a virtual transaction processor. In numerous embodiments, multi-part transactions can include (but are not limited to) transaction initiated by a user and/or transactions that are automatically separated into multiple transactions by the system.

Process 500 then performs (505) a part of the multi-part transaction at a first issuer system. When process 500 determines (510) that the part of the of multi-part transaction has not failed, process 500 determines (520) whether there are more parts of the multi-part transaction. When process 500 determines that there are no remaining parts, the process ends. When process 500 determines that there are remaining parts, the process returns to step 510 to perform a next part of the multi-part transaction.

When process 500 determines (515) that a part of the multi-part transaction has failed, the process can suppress (525) validations and/or notifications at the issuers. In a number of embodiments, suppressing validations ensures that a rollback of the previously successful transactions are not rejected. Process 500 then rolls back (530) a successfully executed part of the multi-part transaction. Process 500 then determines (535) whether there are other successful portions of the multi-part transaction, and when it determines that there are more successful portions, process 500 returns to step 530 and rolls back the next successful portion. When process 500 determines that no more parts of the multi-part transaction remain, the process 500 ends.

Although the present invention has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed:

1. A method for creating accounts at a plurality of payment processors in order to distribute transaction load among the plurality of payment processors, the method comprising:
   creating, by a processing unit, a new virtual account at a virtual payment processor within an account servicing server system, where the virtual payment processor is configured to initialize actual transactions at the plurality of payment processors;
   identifying, by the processing unit, a payment processor of the plurality of payment processors to handle the actual transactions for the new virtual account from the virtual payment processor, where the identified payment processor is identified based upon distributing the transaction load among the plurality of payment processors depending on transaction capacity of each of the plurality of payment processors;
   determining, by the processing unit, whether a previously generated proxy for a new actual account at the identified payment processor exists in a cache local storage of the virtual payment processor;
   performing a first retrieval when the previously generated proxy for the new actual account at the identified payment processor is available within the cache local storage of the virtual payment processor, wherein the first retrieval comprises: retrieving, using the virtual payment processor, the previously generated proxy and account information for the new actual account at the identified payment processor based on the previously generated proxy;
   performing a second retrieval when the previously generated proxy for the new actual account at the identified payment processor is not available within the cache local storage of the virtual payment processor, wherein the second retrieval comprises: retrieving non-proxy account information for the new actual account at the identified payment processor;

associating, by the processing unit, the retrieved account information for the new actual account at the identified payment processor with the new virtual account at the virtual payment processor, wherein the retrieved account information comprises at least one of the non-proxy account information and the account information based on the previously generated proxy;

initializing, by the processing unit, a first actual transaction for the new virtual account at the virtual payment processor; and performing, by the processing unit, the first actual transaction using the new actual account at the identified payment processor.

2. The method of claim 1, wherein the new actual account is for a prepaid card.

3. The method of claim 1, wherein identifying the payment processor comprises:

determining capabilities of each payment processor of the plurality of payment processors; and identifying the payment processor based on the determined capabilities.

4. The method of claim 3, wherein the determined capabilities of the each payment processor comprise a number of actual transactions per second that the each payment processor can handle.

5. The method of claim 1, wherein the account information comprises an account number.

6. A non-transitory computer readable medium including instructions, that when executed by a processing unit, cause the processing unit to create accounts at a plurality of payment processors in order to distribute transaction load among the plurality of payment processors, by performing steps comprising:

creating a new virtual account at a virtual payment processor within an account servicing server system, where the virtual payment processor is configured to initialize actual transactions at the plurality of payment processors;

identifying a payment processor of the plurality of payment processors to handle the actual transactions for the new virtual account from the virtual payment processor, where the identified payment processor is identified based upon distributing the transaction load among the plurality of payment processors depending on transaction capacity of each of the plurality of payment processors;

determining whether a previously generated proxy for a new actual account at the identified payment processor exists in a cache local storage of the virtual payment processor;

performing a first retrieval when the previously generated proxy for the new actual account at the identified payment processor is available within the cache local storage of the virtual payment processor, wherein the first retrieval comprises: retrieving, using the virtual payment processor, the previously generated proxy and account information for the new actual account at the identified payment processor based on the previously generated proxy;

performing a second retrieval when the previously generated proxy for the new actual account at the identified payment processor is not available within the cache local storage of the virtual payment processor, wherein the second retrieval comprises: retrieving non-proxy account information for the new actual account at the identified payment processor;

associating the retrieved account information for the new actual account at the identified payment processor with the new virtual account at the virtual payment processor, wherein the retrieved account information comprises at least one of the non-proxy account information and the account information based on the previously generated proxy;

initializing a first actual transaction for the new virtual account at the virtual payment processor; and performing the first actual transaction using the new actual account at the identified payment processor.

7. The non-transitory computer readable medium of claim 6, wherein the new actual account is for a prepaid card.

8. The non-transitory computer readable medium of claim 6, wherein identifying the payment processor comprises:

determining capabilities of each payment processor of the plurality of payment processors; and identifying the payment processor based on the determined capabilities.

9. The non-transitory computer readable medium of claim 8, wherein the determined capabilities of the each payment processor comprise a number of actual transactions per second that the each payment processor can handle.

10. The non-transitory computer readable medium of claim 6, wherein the account information comprises an account number.

11. A system for creating accounts at a plurality of payment processors in order to distribute transaction load among the plurality of payment processors, the system comprising:

a processing unit; and a memory storing instructions that, when executed by the processing unit, cause the processing unit to perform the steps of:

create a new virtual account at a virtual payment processor within an account servicing server system, where the virtual payment processor is configured to initialize actual transactions at the plurality of payment processors;

identify a payment processor of the plurality of payment processors to handle the actual transactions for the new virtual account from the virtual payment processor, where the identified payment processor is identified based upon distributing the transaction load among the plurality of payment processors depending on transaction capacity of each of the plurality of payment processors;

determine whether a previously generated proxy for a new actual account at the identified payment processor exists in a cache local storage of the virtual payment processor;

perform a first retrieval when the previously generated proxy for the new actual account at the identified payment processor is available within the cache local storage of the virtual payment processor, wherein the first retrieval comprises: retrieving, using the virtual payment processor, the previously generated proxy and account information for the new actual account at the identified payment processor based on the previously generated proxy;

perform a second retrieval when the previously generated proxy for the new actual account at the identified payment processor is not available within the cache local storage of the virtual payment processor, wherein the second retrieval comprises: retrieving non-proxy account information for the new actual account at the identified payment processor;

associate the retrieved account information for the new actual account at the identified payment processor with the new virtual account at the virtual payment processor, wherein the retrieved account information comprises at least one of the non-proxy account information and the account information based on the previously generated proxy;

initialize a first actual transaction for the new virtual account at the virtual payment processor; and perform the first actual transaction using the new actual account at the identified payment processor.

12. The system of claim 11, wherein the new actual account is for a prepaid card.

13. The system of claim 11, wherein identifying the payment processor comprises:

determining capabilities of each payment processor of the plurality of payment processors; and identifying the payment processor based on the determined capabilities.

14. The system of claim 13, wherein the determined capabilities of the each payment processor comprise a number of actual transactions per second that the each payment processor can handle.

15. The system of claim 11, wherein the account information comprises an account number.

* * * * *